United States Patent [19]
Veer

[11] Patent Number: 5,398,518
[45] Date of Patent: Mar. 21, 1995

[54] DEVICE FOR RECOVERING REFRIGERANT FROM A CLOSED COOLING SYSTEM

[75] Inventor: Laurentius H. G. Veer, AT Borne, Netherlands

[73] Assignee: Nido-Universal Machines B.V., Holten, Netherlands

[21] Appl. No.: 939,080

[22] Filed: Sep. 1, 1992

[30] Foreign Application Priority Data

Jul. 13, 1991 [NL] Netherlands ............... 9201258

[51] Int. Cl.[6] .................................... F25B 43/04
[52] U.S. Cl. ................................ 62/195; 62/292; 62/475
[58] Field of Search ............... 62/77, 84, 149, 195, 62/292, 475; 137/318

[56] References Cited

U.S. PATENT DOCUMENTS

| | | | |
|---|---|---|---|
| 4,204,559 | 5/1980 | Wagner | 137/318 |
| 4,967,570 | 11/1990 | Van Steenburgh et al | 62/292 |
| 5,123,259 | 6/1992 | Morgan, Sr. | 62/292 |
| 5,187,953 | 2/1993 | Mount | 62/195 |

*Primary Examiner*—John M. Sollecito
*Attorney, Agent, or Firm*—Webb Ziesenheim Bruening Logsdon Orkin & Hanson

[57] ABSTRACT

The invention relates to a device for recovering refrigerant, particularly chlorofluorocarbons, from a closed cooling system, comprising a perforator with which a gas-tight connection can be formed with the closed cooling system, a device for separating gaseous components from substances coming from the cooling system, which is characterized by a unit for liquefying the refrigerant and separating gaseous components, particularly air, therefrom.

20 Claims, 3 Drawing Sheets

DEVICE FOR RECOVERING REFRIGERANT FROM A CLOSED COOLING SYSTEM

BACKGROUND OF THE INVENTION

The present invention relates to a device for recovering refrigerant, particularly chlorofluorocarbons, from a closed cooling system such as a refrigerator or an air conditioning installation. These are closed cooling systems under higher than atmospheric pressure from which the refrigerant has to be removed before the discarded cooling installations are scrapped. The refrigerant of the cooling system consists generally of chlorofluorocarbons which have a harmful effect on the environment. Release of these refrigerants during scrapping of the cooling installation must be limited as far as possible.

The Netherlands patent application 8902218 describes a method and a device for emptying cooling installations containing chlorofluorocarbons. The cooling system is herein drained and a division is arranged in the first instance between oil and gases present in the cooling system. The refrigerant is ultimately collected in a pressure vessel. It has been found in practice however that air is also sucked along during draining of the cooling system and that this air cannot be selectively discharged via a molecular sieve acting semi-permeably which should be air permeable and impermeable to chlorofluorocarbons.

The present invention has for its object to provide a device for recovering refrigerant, wherein air can be exhausted in adequate manner without any appreciable emission of refrigerant, namely chlorofluorocarbons, occurring.

SUMMARY OF THE INVENTION

This is achieved with the device according to the invention for recovering refrigerant, namely chlorofluorocarbons, from a closed cooling system, which device comprises a unit for liquefying the refrigerant and separating gaseous components, namely air, therefrom.

Because refrigerant is liquefied in such a manner in the presence of other gaseous components, namely air, a division can then be arranged in effective manner between liquid refrigerant and separable gaseous components. The emission of refrigerant is substantially avoided because the partial vapour pressure tension of the liquid refrigerant is relatively low in the prevailing conditions.

In order to bring about the conditions for an optimal liquefying of the refrigerant at the lowest possible partial pressure, it is further recommended that the device comprises a gas conduit connecting onto the gas separating means and provided with a compressor which connects onto a tank for liquid refrigerant, a gas discharge of which is connected via a cooling unit to a gas outlet of the device. According to a preferred embodiment the cooling unit comprises a heat exchanger provided with cooling means, a closing valve arranged in the gas outlet and a control unit which is provided with a pressure sensor connected to the gas discharge and which controls the closing valve and the cooling means. It is thus possible to adjust and maintain the optimum conditions for liquefying refrigerant with the control means, particularly in the case of greatly varying loads in the recovering of refrigerant.

According to a preferred embodiment the control unit is connected to a temperature sensor received in the heat exchanger. It is thus possible to effect an optimal condensation of gaseous refrigerant in the outflowing gases. A very sensitive and rapid action control results when more preferably the temperature sensor is received in the heat exchanger on the gas side.

In preference the heat exchanger is a cooling pipe heat exchanger located at a higher level than the tank for liquid refrigerant. It is thus possible for condensed, returning refrigerant to be in contact with gas flowing past which may still contain refrigerant, so that the condensation of refrigerant is further improved. In order to ensure an adequate discharge of liquid refrigerant, wherein the operation takes places as far as possible under prevailing condensation conditions, it is further recommended that the tank for liquid refrigerant is provided with level control means with which a closing valve arranged in the refrigerant outlet of the refrigerant tank can be operated.

Mentioned and other features of the device according to the invention will be further elucidated hereinbelow in the light of a number of embodiments which are only given by way of example, wherein reference is made to the annexed drawing.

BRIEF DESCRIPTION OF THE DRAWINGS

In the drawing:

FIG. 5 shows on larger scale a section through the cooling pipe heat exchanger of the cooling unit.

DESCRIPTION OF THE PREFERRED EMBODIMENTS

Figure 1:
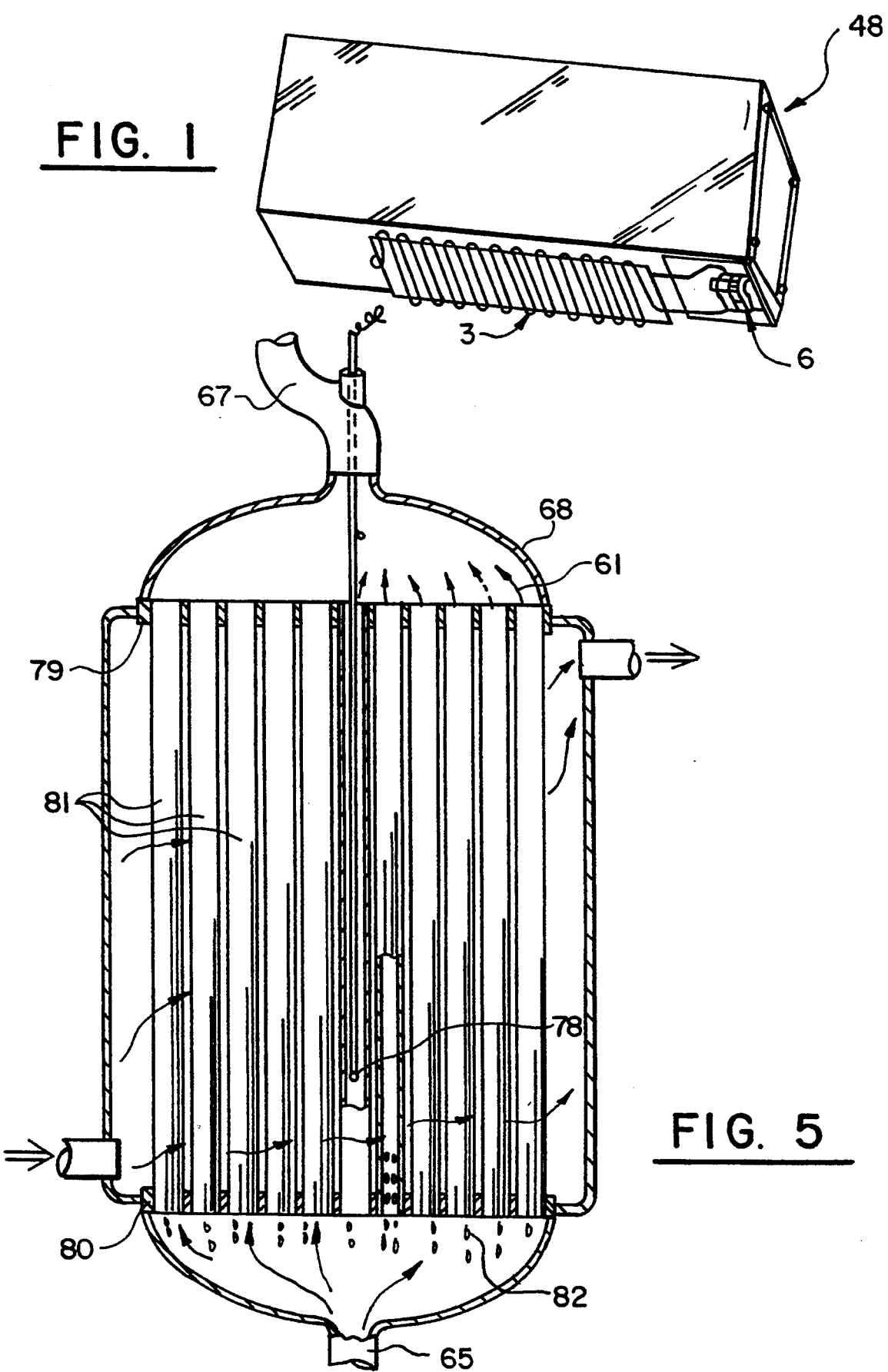
FIG. 1 is a tilted refrigerator provided with a cooling system.
Figure 2:
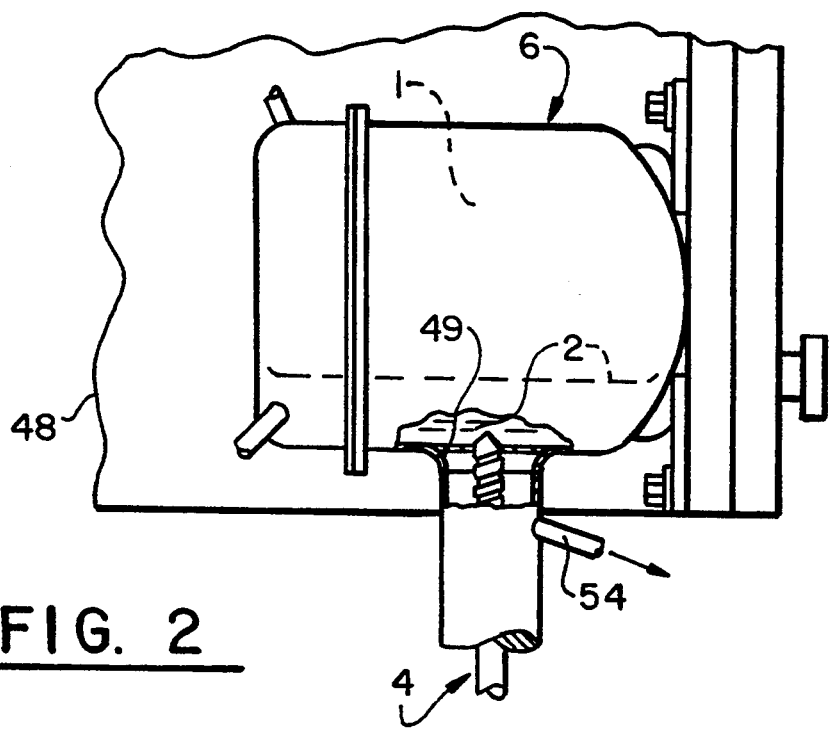
FIG. 2 shows on a larger scale detail II in FIG. 1 during perforation of the compressor pot.

In order to open the cooling system 3 where the oil 2 is situated, the refrigerator 48 is positioned above a perforator 4, for instance a drilling machine, such that the compressor pot 6 forms the lowest-lying part of the cooling system 3 (FIGS. 1 and 2).

A gas-tight connection with the side wall of compressor pot 6 is then effected by a sleeve 49 arranged round the head of the drilling machine 4 and this wall is bored through. The bore exertion force is herein compensated by for instance a part of the refrigerator weight. At the moment the wall of the compressor pot 6 is perforated the oil 2 will flow out of the compressor pot 6 as a result of the overpressure in the system 3 and an underpressure applied in the sleeve 49. Because the pot 6 is perforated at the lowest point all oil 2 must first flow out of the system 3 before the chlorofluorocarbons 1 can flow away.

The oil 2 and chlorofluorocarbons 3 flowing out of the system 3, augmented with bore chips, are guided through a conduit 54 to a collecting and separating installation 7 (FIG. 3) and flow to a first separating tank 12 which is partly transparent and in which is situated a filter 20 for the bore chips. Because the tank 12 is transparent the quality of the oil 2 flowing out of the cooling system 3 can be visually checked if the quality of the oil 2 is good, a first closing valve 16 is opened and the oil 2 and chlorofluorocarbons 1 flow to a second separating tank 21. In the case that the oil 2 is found to be burnt and thereby contains acids, it is guided to a storage tank by opening a second closing valve 19 and further treated as chemical waste. An adverse effect on the separating installation 7 by the acid-containing oil is hereby prevented and contamination of the oil suitable for re-use by the burnt oil is also prevented.

When the flow enters the second separating tank 21 the last remaining small chips are removed by magnets 50, where-after the oil 2 collects at the bottom of the tank 21 and the gaseous chlorofluorocarbons 1 in the space thereabove. When a first control valve 51 is in a position in which the second separating tank 21 is in communication with a compressor system 25, consisting for instance of a one or two-stage compressor, as per se known from domestic refrigerators, a lower than atmospheric pressure will result in the second separating tank 21, whereby the chlorofluorocarbons 1 and other gaseous components such as air are drawn out of the separating tank 21 by the compressor 25.

After the chlorofluorocarbons 1 have been removed from the second separating tank 21, the oil 2 is pumped therefrom by a pump 29 over a second control valve 53 to a third separating tank 30 in which a lower than atmospheric pressure prevails, since the first control valve 51 is now so positioned that the third separating tank 30 communicates with the compressor 25. In order to cause rapid desorption of the chlorofluorocarbons 1 and other gaseous components dissolved in the oil 2, the vapour pressure in the third separating tank 30 is reduced by spreading the oil 2 over a large surface area. To this end the oil 2 runs out over a flat plate 36 placed under the feed opening 31. The diffused chlorofluorocarbons 1 and gaseous components are drawn off by the compressor 25. When the second control valve 53 is so positioned that a recirculation line 35 connected to the underside of the third separating tank 30 is connected to the pump 29, the oil 2 can be recirculated until a sufficient portion of the chlorofluorocarbons 1 is diffused out of the oil 2, whereafter the oil 2 can be drained to a second storage tank by opening a third closing valve 37.

Figure 4:
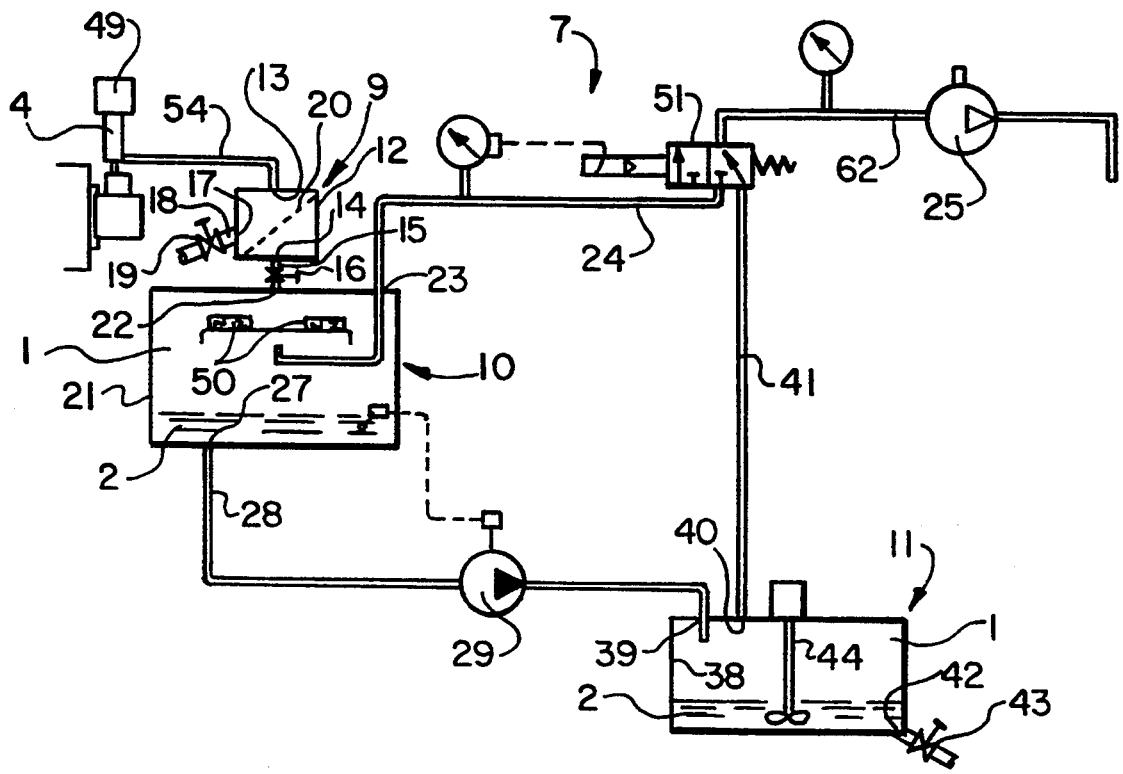
FIGS. 3 and 4 each show a schematic diagram of an embodiment of the device according to the invention.

In an alternative embodiment of the collecting and separating installation 7 the oil 2 is pumped out of the second separating tank 21 to a fourth separating tank 38 (FIG. 4), wherein an installation 44 is arranged for keeping the oil 2 in motion. The movement accelerates the desorption of the chlorofluorocarbons and gaseous components out of the oil 2, whereafter the diffused chlorohydrocarbons 1 are drawn off by the compressor 25. When desorption of the greater part of the chlorofluorocarbons 1 out of the oil 2 has taken place, the oil 2 is removed from the fourth separating tank 38 and drained by opening fourth closing valve 43. Not all the oil 2 is herein removed from the tank 38 in order to prevent chlorofluorocarbons possibly also escaping through the oil outlet opening 42.

Figure 3:
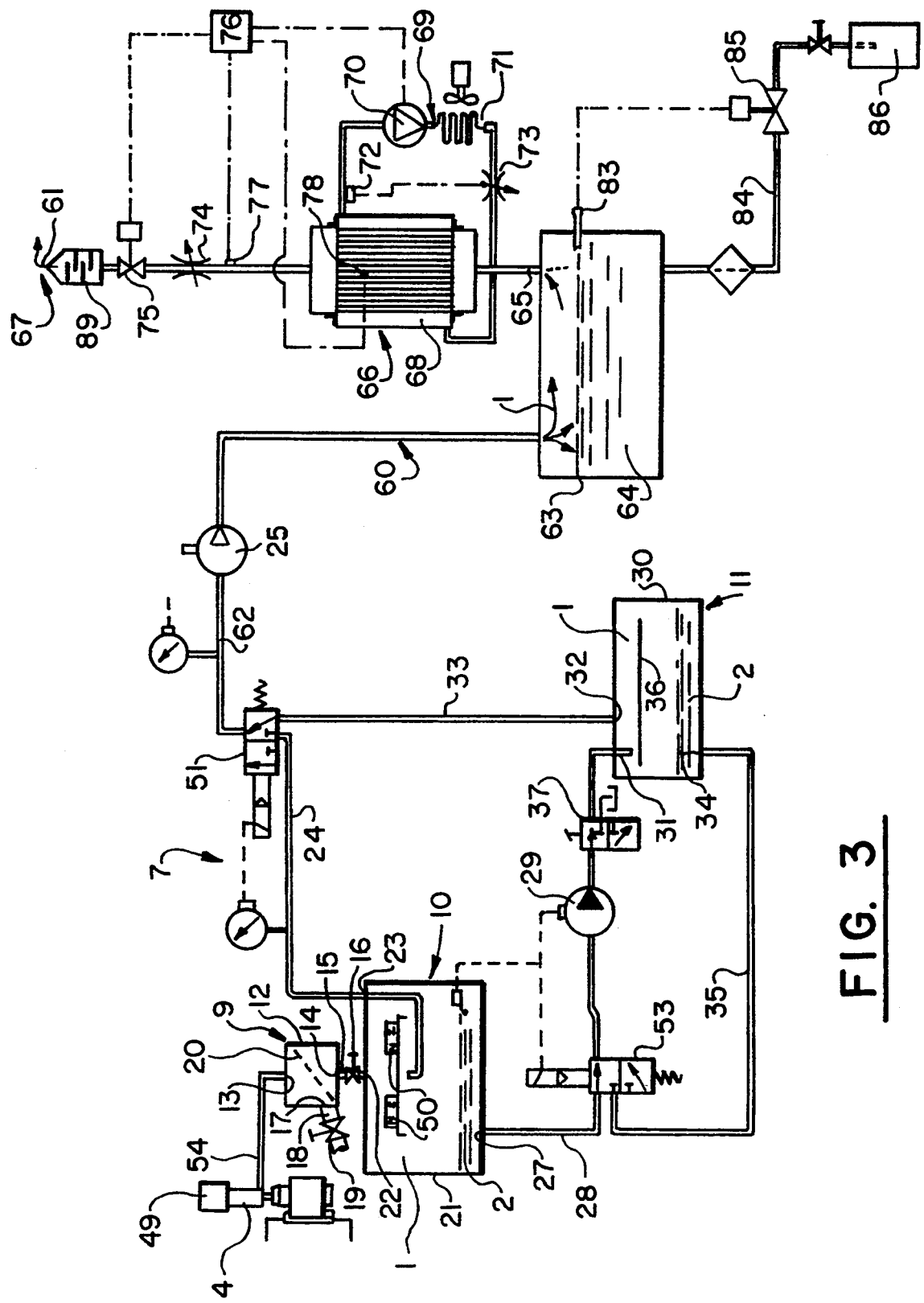

As shown in detail in FIG. 3, the separating installation 7 comprises a unit 60 for liquefying the refrigerant 1 and for separating gaseous components 61, in particular air, therefrom. The unit 60 comprises a gas conduit 62 provided with the compressor 25 which connects onto a tank 63 for liquid refrigerant 64, whereof a gas discharge 65 is connected via a cooling unit 66 to a gas outlet 67. The cooling unit 66 comprises an indirect cooling pipe heat exchanger 68 which is cooled using cooling means 69. The cooling means 69 comprise a compressor 70 and a condenser 71. The heat exchanger 68 functions as evaporator. The degree of superheating is controlled with a throttle 73 operated by a sensor 72.

Further received in the gas outlet 67 are a controllable throttle 74 and a closing valve 75.

Finally, the cooling unit further comprises a pressure sensor 77 which is connected to the gas outlet 67 and a temperature sensor 78 which is received on the gas side in the heat exchanger 68. Both sensors 77 and 78 as well as the closing valve 75 and the compressor 70 are connected to a control unit 76.

The heat exchanger 68, which comprises a large number of cooling pipes 81 extending between pipe plates 79 and 80, is located at a higher level than the tank 63. Liquid refrigerant condensed in the cooling pipes 81 thus flows downward along the inner surface and moves via the gas discharge 65 into counter flow with the gas in the tank 63.

The tank 63 is provided with level control means 83 which are connected to a closing valve 85 arranged in a refrigerant outlet 84. The latter is connectable to a collecting container 86 substantially for refrigerant 64 only.

The operation of the unit 60 is as follows.

Using the compressor 25 a pressure is generated of approximately 18 bar whereby the refrigerant, for instance chlorofluorocarbon, condenses (saturated vapour pressure about 7 bar). The closing valve 75 in the gas outlet 61 is closed until, using the cooling means 69, a temperature of for instance $-50°$ C. is reached in the heat exchanger 68. The closing valve 75 is opened and the gas flows out of the tank 63 through the heat exchanger in which condensing gases, substantially refrigerant 82, condenses and flows back into the tank 63. Non-condensing gases, particularly air, pass through the closing valve 65 and are exhausted into the atmosphere via an air filter 89. When the pressure in the unit 60, which is measured with the pressure sensor 77, falls below 18 bar or when the temperature in the heat exchanger, measured with the temperature sensor 78, rises above $-90°$ C. the closing valve 75 is closed. The unit 60 thereby fluctuates round temperatures of about $-90°$ C. and/or a pressure of roughly 18 bar.

It has been found that using the control unit 76 which operates the diverse sensors and closing valves an undesired emission of refrigerant via the gas outlet 67 can be reduced by more than 25%.

The concentration of refrigerant in the vented gas components 61 is at most equal to the saturated vapour pressure and is generally smaller than 100 dpm. This concentration is subject among other things to the adjusted and prevailing temperature and pressure in the unit 60.

I claim:

1. A device for recovering refrigerant from a closed cooling system, comprising:
   a perforator with which a gas-tight connection can be formed with the cooling system;
   means for separating gaseous components from substances coming from the cooling system; and
   a unit for liquefying the refrigerant and separating gaseous components therefrom,
   wherein the unit includes a gas conduit which connects onto the gas separating means and which is provided with a compressor which connects onto a tank for liquid refrigerant, a gas discharge of said tank for liquid refrigerant being connected via a cooling unit to a gas outlet of the device for discharging non-condensable gaseous components separated from said liquid refrigerant.

2. The device as claimed in claim 1, wherein a control unit is connected to a temperature sensor received in the cooling unit.

3. The device as claimed in claim 2, wherein the temperature sensor is received on a gas side in the cooling unit.

4. The device as claimed in claim 3, wherein the cooling unit is a cooling pipe heat exchanger located at a higher level than the tank for liquid refrigerant.

5. The device as claimed in claim 4, wherein the tank for liquid refrigerant is provided with level control means with which a closing valve arranged in a refrigerant outlet of the refrigerant tank can be controlled.

6. The device as claimed in claim 2, wherein said cooling unit is a cooling pipe heat exchanger located at a higher level than said tank for liquid refrigerant.

7. The device as claimed in claim 6, wherein said tank for liquid refrigerant is provided with level control means with which a closing valve arranged in a refrigerant outlet of said refrigerant tank can be controlled.

8. The device as claimed in claim 1, wherein said tank for liquid refrigerant is provided with level control means with which a closing valve arranged in a refrigerant outlet of said refrigerant tank can be controlled.

9. The device as claimed in claim 2, wherein said tank for liquid refrigerant is provided with level control means with which a closing valve arranged in a refrigerant outlet of said refrigerant tank can be controlled.

10. The device as claimed in claim 3, wherein said tank for liquid refrigerant is provided with level control means with which a closing valve arranged in a refrigerant outlet of said refrigerant tank can be controlled.

11. A device for recovering refrigerant from a closed cooling system, comprising:
   a perforator with which a gas-tight connection can be formed with the cooling system;
   means for separating gaseous components from substances coming from the cooling system; and
   a unit for liquefying the refrigerant and separating gaseous components therefrom,
   wherein the unit includes a gas conduit which connects onto the gas separating means and which is provided with a compressor which connects onto a tank for liquid refrigerant, a gas discharge of said tank for liquid refrigerant being connected via a cooling unit to a gas outlet of the device, and
   wherein the cooling unit includes a heat exchanger provided with cooling means, a closing valve arranged in the gas outlet and a control unit which is provided with a pressure sensor connected to the gas discharge and which controls the closing valve and the cooling means.

12. The device as claimed in claim 11, wherein the tank for liquid refrigerant is provided with level control means with which a closing valve arranged in a refrigerant outlet of the refrigerant tank can be controlled.

13. The device as claimed in claim 11, wherein the control unit is connected to a temperature sensor received in the heat exchanger.

14. The device as claimed in claim 13, wherein the tank for liquid refrigerant is provided with level control means with which a closing valve arranged in a refrigerant outlet of the refrigerant tank can be controlled.

15. The device as claimed in claim 13, wherein the heat exchanger is a cooling pipe heat exchanger located at a higher level than the tank for liquid refrigerant.

16. The device as claimed in claim 13, wherein the temperature sensor is received on a gas side in the heat exchanger.

17. The device as claimed in claim 16, wherein the heat exchanger is a cooling pipe heat exchanger located at a higher level than the tank for liquid refrigerant.

18. The device as claimed in claim 16, wherein the tank for liquid refrigerant is provided with level control means with which a closing valve arranged in a refrigerant outlet of the refrigerant tank can be controlled.

19. The device as claimed in claim 11, wherein the heat exchanger is a cooling pipe heat exchanger located at a higher level than the tank for liquid refrigerant.

20. The device as claimed in claim 19, wherein the tank for liquid refrigerant is provided with level control means with which a closing valve arranged in a refrigerant outlet of the refrigerant tank can be controlled.

* * * * *